(12) United States Patent
Horwitz et al.

(10) Patent No.: US 7,594,222 B2
(45) Date of Patent: Sep. 22, 2009

(54) SYSTEM AND METHOD FOR SOURCE CODE ANALYSIS

(75) Inventors: Jeffrey Stuart Horwitz, Phoenix, AZ (US); Mahesh Kumar Kacholia, Maharastra (IN); Marc J. Klemp, Phoenix, AZ (US); Neeraj Sharma, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 919 days.

(21) Appl. No.: 11/143,016

(22) Filed: Jun. 1, 2005

(65) Prior Publication Data

US 2006/0277531 A1 Dec. 7, 2006

(51) Int. Cl.
G06F 9/45 (2006.01)
G06F 17/00 (2006.01)
(52) U.S. Cl. ........................ 717/137; 715/239
(58) Field of Classification Search ................. 717/137; 715/236, 239
See application file for complete search history.

(56) References Cited

U.S. PATENT DOCUMENTS

| 6,343,328 | B1* | 1/2002 | Murphy et al. | 709/246 |
| 6,986,101 | B2* | 1/2006 | Cooper et al. | 715/239 |
| 7,146,564 | B2* | 12/2006 | Kim et al. | 715/235 |
| 2004/0205507 | A1* | 10/2004 | Tuschner et al. | 715/501.1 |
| 2006/0031820 | A1* | 2/2006 | Li | 717/137 |

* cited by examiner

Primary Examiner—Wei Y Zhen
Assistant Examiner—Chih-Ching Chow
(74) Attorney, Agent, or Firm—Snell & Wilmer L.L.P.

(57) ABSTRACT

The invention includes a tool for creating hypertext enabled documents based on one or more source code files wherein calls to programs, subprograms, or functions are hyperlinked to corresponding code sections. The tool may also add documentation to explain interrelationships among code components and variables. Furthermore, a user may access the tool over the Internet or intranet in order to invoke the creation of hypertext enabled documents and then save the resulting documents within a database or download the documents to a local drive.

16 Claims, 5 Drawing Sheets

SYSTEM AND METHOD FOR SOURCE CODE ANALYSIS

COPYRIGHT CLAIM

A portion of the disclosure contains material to which a claim for copyright is made. The copyright owner has no objection to the facsimile reproduction by anyone of the patent document or patent disclosure, as it appears in the Patent and Trademark Office patent file or records, but reserves all other copyrights whatsoever.

REFERENCE TO A COMPUTER PROGRAM LISTING APPENDIX

A computer program listing appendix is filed herewith submitted on a single compact disk (Copy 1) and a duplicate copy (Copy 2) of the compact disk. The contents of the compact disk, and its duplicate copy, include a single ASCII file entitled, "Code Parser", created on Sep. 6, 2005, which is 2 KB in size. The contents of this appendix, filed on compact disk, are incorporated herein by reference.

FIELD OF THE INVENTION

The invention generally relates to a source code analysis tool that provides application developers the ability to quickly and conveniently navigate interrelated code modules, and more particularly, to a system and method for converting standard legacy language code into interrelated, hyperlink-enabled HTML files.

BACKGROUND OF THE INVENTION

Developers of programming tools often search for ways to increase programming efficiency and accuracy, encourage reuse of code and help foster repeatable programming processes. A number of software tools ranging from planning tools (e.g., Microsoft Project™) to object based coding environments (e.g., Microsoft Visual Basic™) have helped achieve these goals. Such tools also include a number of Database Management Systems (DBMS) and code generators such as Microsoft Visual InterDev™.

Other tools help programmers organize and document code. In large application development projects, maintaining organization is vital because, for example, there may be hundreds of individual code components (e.g. functions, procedures, etc.). Among the many functions and procedures, there usually exist many interdependencies, wherein code components make calls, or pass control to other code components to perform specific operations. Maintaining an understanding of existing code components and the structure of interdependencies, often helps to prevent duplication of effort, reduces programmer error, and simplifies the overall development and maintenance procedures.

"Commenting" is another practice which is effectively used to simplify understanding of code components and interdependencies. Commenting is the practice of placing plain language text within the body of programming code and is most often used to briefly explain the functionality of the code component and to describe interdependencies. Most programming languages support commenting by designating a key character to be used to mark the beginning and end of the comment body. The key character tells the compiler to ignore the comment text. This has traditionally been a manual process wherein the programmer must be disciplined in entering comments during the authoring process. However, due to stylistic differences between programmers, comments are not always as effective as intended. Also, programmers may overlook commenting altogether.

As a part of the Java Development Kit (JDK), Sun Microsystems developed a technology known as Javadocs to automatically manage interdependencies and provide limited code commenting. Javadocs are a set of interrelated code components that have been hyperlink-enabled. This enables a programmer to quickly navigate through the logical structure of a program in order to develop a better understanding and to create greater efficiency in development and maintenance procedures. For example, a main portion of a program that has been designed to calculate mortgage interest based on interest rate and term may include a call to a function that performs amortization calculations. In Javadocs, the function name appearing in the body of the programming code may be hyperlinked to that function. As a result, the programmer may simply click on the function name in order to view the function, rather than manually searching and opening the function.

The efforts expended to create more robust programming tools have largely been in relation to object oriented programming languages such as, for example, C++, Visual Basic, and Java. Legacy languages such as COBOL, however, have received little attention since its use is generally limited. Also, because COBOL is not an object oriented language, some may believe that the code management tools discussed above would not be effective. However, as computing technology has advanced, so too has the level of sophistication required from newly created and/or modified programs in the legacy environment. Therefore, a need exists within the legacy programming environment for a tool with similar functionality in providing code component and interdependency management.

SUMMARY OF THE INVENTION

The invention overcomes the limitations and problems of the prior art by providing a system and method for facilitating the management of code component and interdependency information within legacy programming environments. More particularly, the invention provides for a tool that is capable of reading legacy code, identifying function and/or procedure calls, generating hypertext-enabled HTML documents containing code components, generating summary documentation and generating indexes for efficient access to code modules. The system includes an internet server configured to receive legacy code from a remote programmer, generate a bundle of HTML files based on content and structure of legacy code and enabling the HTML files to be available to the remote programmer for navigation.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

Figure 1:
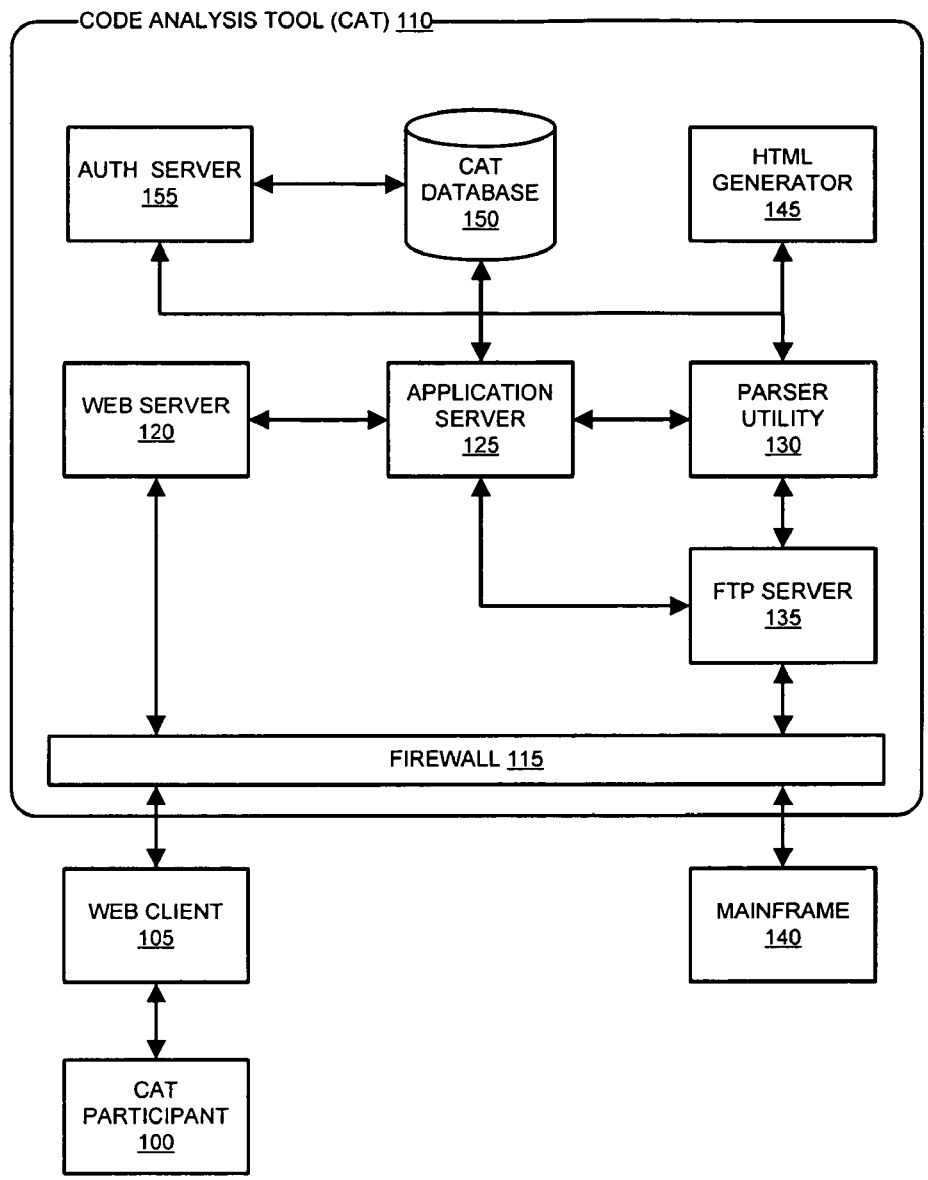
FIG. 1 is a block diagram illustrating the major system components for an exemplary code analysis tool according to an embodiment of the invention.

In general, the invention includes a system and method for generating hyperlink-enabled computer code which may be displayed within a browser application over a network. With reference to FIG. 1, the invention enables a participant 100 to connect to a web server 120 through a network (e.g., Internet) based application, such as a web client 105. Participant 100 may interact with code analysis tool (CAT) 110 to select one or more code files stored on a mainframe 140 and invoke code parser 130 and HTML generator 145 to create hyperlink-enabled HTML files containing code components such as, for example, procedures, functions and/or variables. In one embodiment, the system also includes one or more of application server 125, authentication server 155, Database 150, FTP server 135 and firewall 115.

As will be appreciated by one of ordinary skill in the art, the invention may be embodied as a customization of an existing system, an add-on product, upgraded software, a stand alone system (e.g., kiosk), a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Participant 100 may include any individual, business, entity, government organization, software and/or hardware which interacts with the invention to generate hyperlink-enabled HTML files containing code components. Participant 100 may be, for example, a programmer, technical architect, project manager, analyst, software tester, quality assurance analyst and the like. Participant 100 may interface with CAT 110 via any communication protocol, device or method discussed herein or known in the art. In one embodiment, Participant 100 may interface with the system via an Internet browser. Web client 105 may comprise any hardware and/or software suitably configured to facilitate input, receipt and/or review of any information related to CAT 110 or any information discussed herein. Web client 105 may include any device (e.g., personal computer) which communicates (in any manner discussed herein) with CAT 110 via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 105 may or may not be in direct contact with the CAT 110. For example, web client 105 may access the services of CAT 110 through another server which may have a direct or indirect connection to web server 120.

Web server 120 may include any hardware and/or software suitably configured to facilitate communications between web client 105 and one or more CAT 110 components. Further, web server 120 may be configured to transmit data to web client 105 within markup language documents. Web server 120 may operate as a single entity in a single geographic location or as separate computing components located together or in separate geographic locations. Requests originating from client browser 105 may pass through a firewall 115 before being received and processed at web server 120. As used herein, "transmit" may include sending electronic data from one system component to another over a network connection. Additionally, as used herein, "data" may include encompassing information such as commands, queries, files, data for storage, and the like in digital or any other form.

Firewall 115, as used herein, may comprise any hardware and/or software suitably configured to protect CAT 110 resources from users from other networks. Firewall 115 may reside in varying configurations including Stateful Inspection, Proxy based and Packet Filtering among others. Firewall 115 may be integrated as software within CAT 110, any other system components or may reside within another computing device or may take the form of a standalone hardware component.

Web server 120 may invoke application server 125 to process requests. Application server 125 may include any hardware and/or software suitably configured to serve applications and data to connected web clients 105. Like web server 120, application server 125 may communicate with any number of other servers, databases and/or components through any means known in the art. Further, application server 125 may serve as a conduit between web server 120 and the systems and components of CAT 110. As presented herein, Participant 100 may interact with application server 125 through an Internet and/or intranet connection. However, those skilled in the art will appreciate that Participant 100 may interact with application server 125 through any communications protocol known in the art or discussed herein, including a Local Area Network (LAN), for example.

In order to control access to the services of CAT 110, application server 125 may invoke an authentication server 155 in response to submission of a Participant's 100 authentication credentials received at web server 120. Authentication server 155 may include any hardware and/or software suitably configured to receive authentication credentials, encrypt and decrypt credentials, authenticate credentials, and grant access rights according to Participant 100 pre-defined privileges attached to the credentials. Authentication server 155 may grant varying degrees of application and data level access to Participant's 100 based on user information stored within Database 150. For example, a software tester may be limited to viewing existing CAT documents while a programmer may be provided access to view existing CAT documents and generate new CAT documents. A project manager, on the other hand, may be allowed to view, add and delete CAT documents within a Database 150.

In order to control access to the services of CAT 110, application server 125 may invoke an authentication server 155 in response to submission of a Participant's 100 authentication credentials received at web server 120. Authentication server 155 may include any hardware and/or software suitably configured to receive authentication credentials, encrypt and decrypt credentials, authenticate credentials, and grant access rights according to Participant 100 pre-defined privileges attached to the credentials. Authentication server 155 may grant varying degrees of application and data level access to Participant's 100 based on user information stored within CAT Database 150. For example, a software tester may be limited to viewing existing CAT documents while a programmer may be provided access to view existing CAT documents and generate new CAT documents. A project manager, on the other hand, may be allowed to view, add and delete CAT documents within a CAT Database 150.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the invention by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

FTP server 135 may include any hardware and/or software suitably configured to facilitate uploading or downloading of files to and from remote computer systems on a network using TCP/IP, such as the Internet. FTP server 135 may receive requests from application server 125 to transfer one or more files from mainframe 140 to code parser 130. Additionally, FTP server 135 may be invoked by application server 125 to retrieve mainframe 140 file and directory information.

Parser utility 130 may include any hardware and/or software suitably configured to read source control files and/or apply logic to identify and extract sections within a COBOL program. Parser utility 130 may be invoked by application server 125 in response to a new request for CAT documents and receive one or more source code files for processing from FTP server 135.

HTML generator 145 may include any hardware and/or software suitably configured to receive instructions (e.g., from parser utility) relating to formatting and constructing HTML documents based on the instructions. Practitioners will appreciate that the functionality of the parser utility 130 and HTML generator 145 may be combined into a single utility, but for explanation, are herein described as individual entities.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, offline communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The invention contemplates uses in association with web services, utility computing, pervasive and individualized computing, security and identity solutions, autonomic computing, commodity computing, mobility and wireless solutions, open source, biometrics, grid computing and/or mesh computing.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Referring now to FIGS. 2-4B, the process flows depicted are merely embodiments of the invention and are not intended to limit the scope of the invention as described above. For example, the steps recited in any of the method or process descriptions may be executed in any order and are not limited to the order presented. It will be appreciated that the following description makes appropriate references not only to the steps depicted in FIGS. 2-4B, but also to the various system components as described above with reference to FIG. 1. Further, illustrations of the process flows and the descriptions thereof make reference to webpages, websites, web forms, prompts, etc. Practitioners will appreciate that the illustrated steps described below may exist in any number of configurations including the use of webpages, web forms, popup windows, prompts and the like. It should be further appreciated that the multiple steps as illustrated and described may be combined onto single webpages but have been expanded for the sake of simplicity. In other cases, steps illustrated and described as single process steps may be broken down into multiple webpages but have been combined for simplicity.

Practitioners will also appreciate that there are a number of methods for displaying data within a browser based document. Data may be represented as standard text or within a fixed list, scrollable list, drop-down list, editable text field, fixed text field, pop-up window, and the like. Likewise, there are a number of methods available for modifying data in a webpage such as, for example, free text entry using a keyboard, selection of menu items, check boxes, option boxes, and the like.

Figure 2:
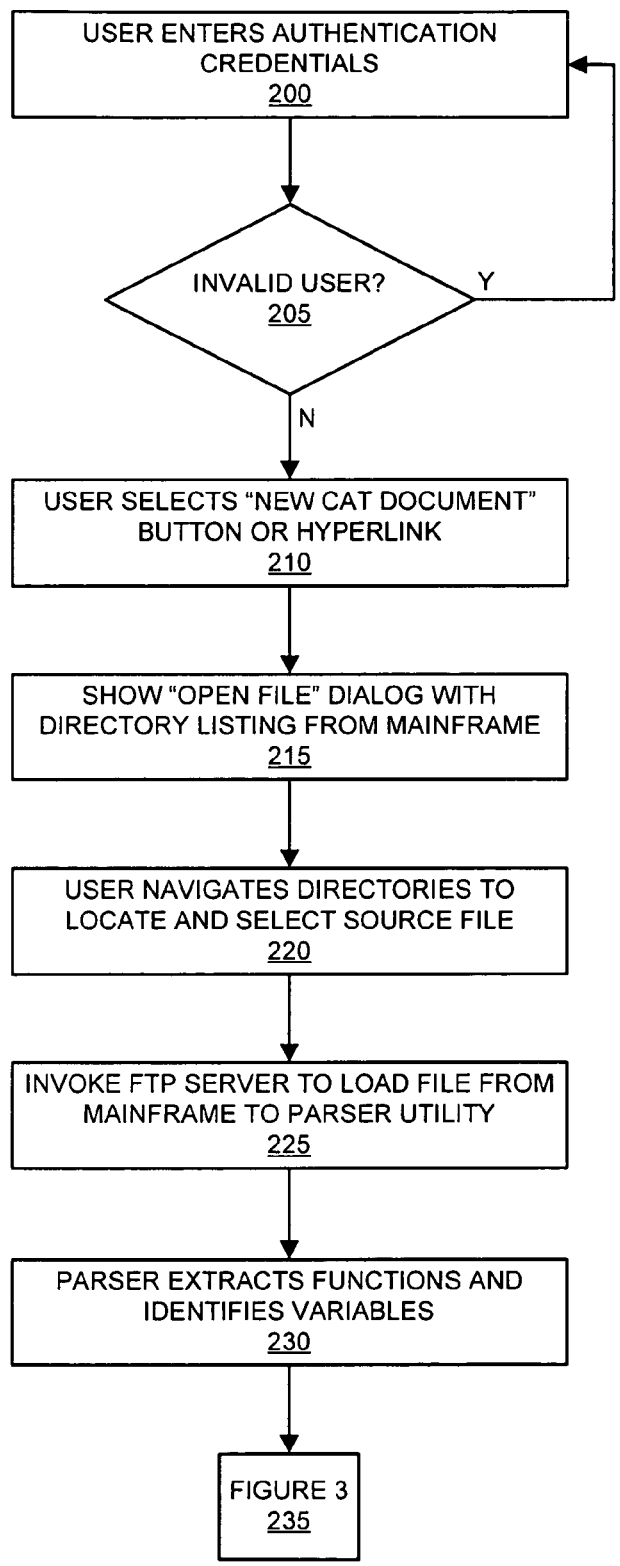
FIG. 2 is a flow chart illustrating an exemplary method for interacting with a code analysis tool in order to create hyperlink-enabled code in html documents according to an embodiment of the present invention.

FIG. 2 is a flow chart illustrating an exemplary method for interacting with a code analysis tool in order to create hyperlink-enabled code in html documents according to an embodiment of the present invention. When a participant 100 accesses the homepage for a main CAT 110 website, the participant may be prompted to enter authentication credentials (step 200). Practitioners will appreciate that user authentication methods are well known and the invention may employ any number of authentication techniques in order to control access to the systems of the invention. If participant 100 enters invalid credentials (step 205), then participant 100 may be alerted and again prompted to enter authentication credentials (step 200). However, if participant 100 is deemed to be a valid user (step 205), then participant 100 may be presented with a webpage providing links to invoke the various features of the invention. For example, while not illustrated, a webpage may provide a link that when selected, enables a participant 100 to select from one or more existing CAT documents to view. If participant 100 selects a link or button to create a new CAT document (step 210), then participant 100 may be presented a file dialog listing the content of various directories with a mainframe (step 215). Those skilled in the art will appreciate that such file dialog windows generally allow users to navigate at least a portion of a computer's directory structure in order to locate files and/or open files. Further, there are a number of methods which may be employed to obtain directory information from a mainframe computer. One such means is through an FTP server 135.

Participant 100 may navigate the directory structure of a mainframe in order to locate and select the desired one or more source code files (step 220). Application server 125 may then invoke FTP server 135 to transfer the selected file(s) from mainframe 150 to code parser utility (step 225). Parser utility 130 may extract procedures or logical groupings of code and identify procedure calls and variables (step 230). In an exemplary embodiment, parser utility 130 may contain logic enabling it to read source code and identify variable and function calls automatically. Parser utility 130 could accomplish this through recognizing code structures and/or textual indicators such as, for example, parenthesis indicating that the text between the open and close parenthesis is a variable. In COBOL, keywords such as "CALL" and "USING" would most likely be followed by a function or subprogram name and a parameter, respectively. The process of converting a source code file to linked HTML pages continues in FIG. 3 (step 235).

Figure 3:
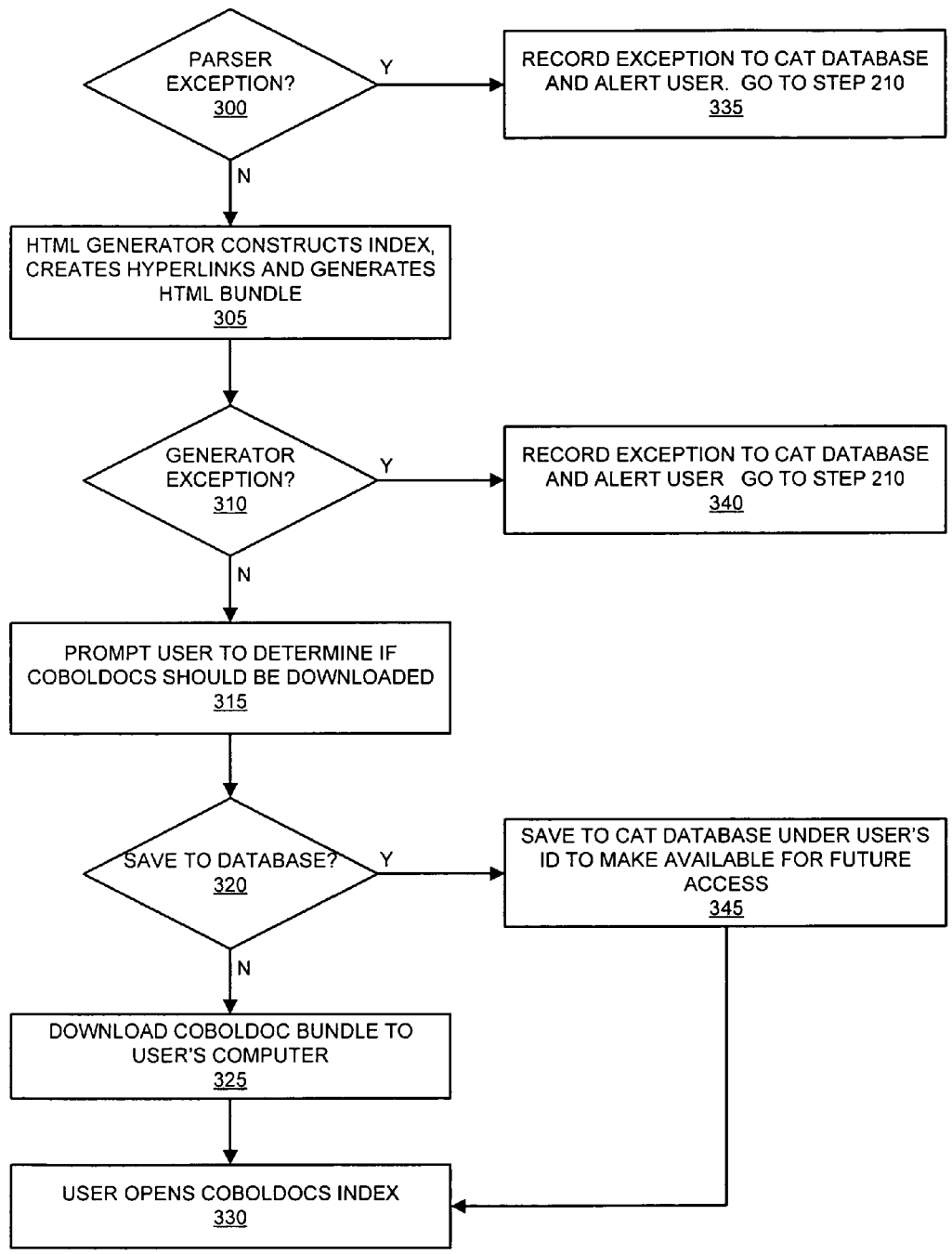
FIG. 3 is a flow chart which is a continuation of FIG. 2 illustrating an exemplary method for interacting with a code analysis tool in order to create hyperlink-enabled code in html documents according to an embodiment of the present invention.

FIG. 3 is a flow chart which is a continuation of FIG. 2 illustrating an exemplary method for interacting with a code analysis tool in order to create hyperlink-enabled code in html documents according to an embodiment of the present invention. If an error, or exception, is encountered during the parsing process, details regarding the exception may be stored within database and participant 100 may again be presented with a webpage from where they may try again (step 210). Storing details relating to an exception may enable administrators to more quickly diagnose hardware and/or software problems. Moreover, if an error is due to an unintentional selection of an unsupported file type, then participant 100 may be notified in order to repeat the process and selecting to proper file.

When parsing is complete, control may be transferred to HTML generator 145 to construct indexes, create hyperlinks between interdependent programs, subprograms and functions and/or to generate an HTML bundle containing the hypertext enabled code modules (step 305). Specifically, HTML generator 145 may comprise an application that builds HTML pages dynamically based on information received from parser utility 130. In one embodiment, HTML generator 145 may process information sequentially. For example, parser utility 130 may pass HTML generator 145 a single function among many in a source code file. The function may contain markers inserted by parsing utility 130 that identify various code elements such as, for example, function names, variables, parameters and the like. HTML generator 145 may process the single function by creating hyperlinks, adding comments, etc. Upon completion of processing by HTML generator 145, parser utility 130 may transfer a next portion of code. Practitioners will appreciate that the functionality of parser utility 130 and HTML generator 145 may be integrated into a single application, however have been illustrated in FIG. 3 as two specific entities for the purpose of explanation only. If HTML generator 145 encounters an exception (step 310), then the process described in reference to step 300 may be executed, recording the exception within database 150 (step 340).

If processing of the selected source code file is completed without exception (step 310), then participant 100 may be prompted to select a preference for delivery and retention of the newly generated CAT documents. Among other possible choices, participant 100 may choose to download the CAT documents to his or her local drive or save them within database 150 (step 315). Saving the CAT documents to database 150 may be optimal in enabling other participants 100 to view the CAT documents. If participant 100 chooses to save the CAT documents to database 150, then application server 125 may transmit the CAT document to database 150 along with any other information such as an identifier of the original source code module, a timestamp of when the documents were created, the identification of the participant who ordered the CAT document, etc. (step 345). If, however, participant chooses to download the CAT documents, the documents may not be saved to a database 150 and the CAT documents may be compressed into a zip file, for example, and downloaded to participant's 100 local drive. After the CAT documents have been saved or downloaded, participant 100 may open an index for the CAT documents in order to begin viewing the various hyperlink-enabled programs, subprograms, functions and/or variables.

Figure 4A:
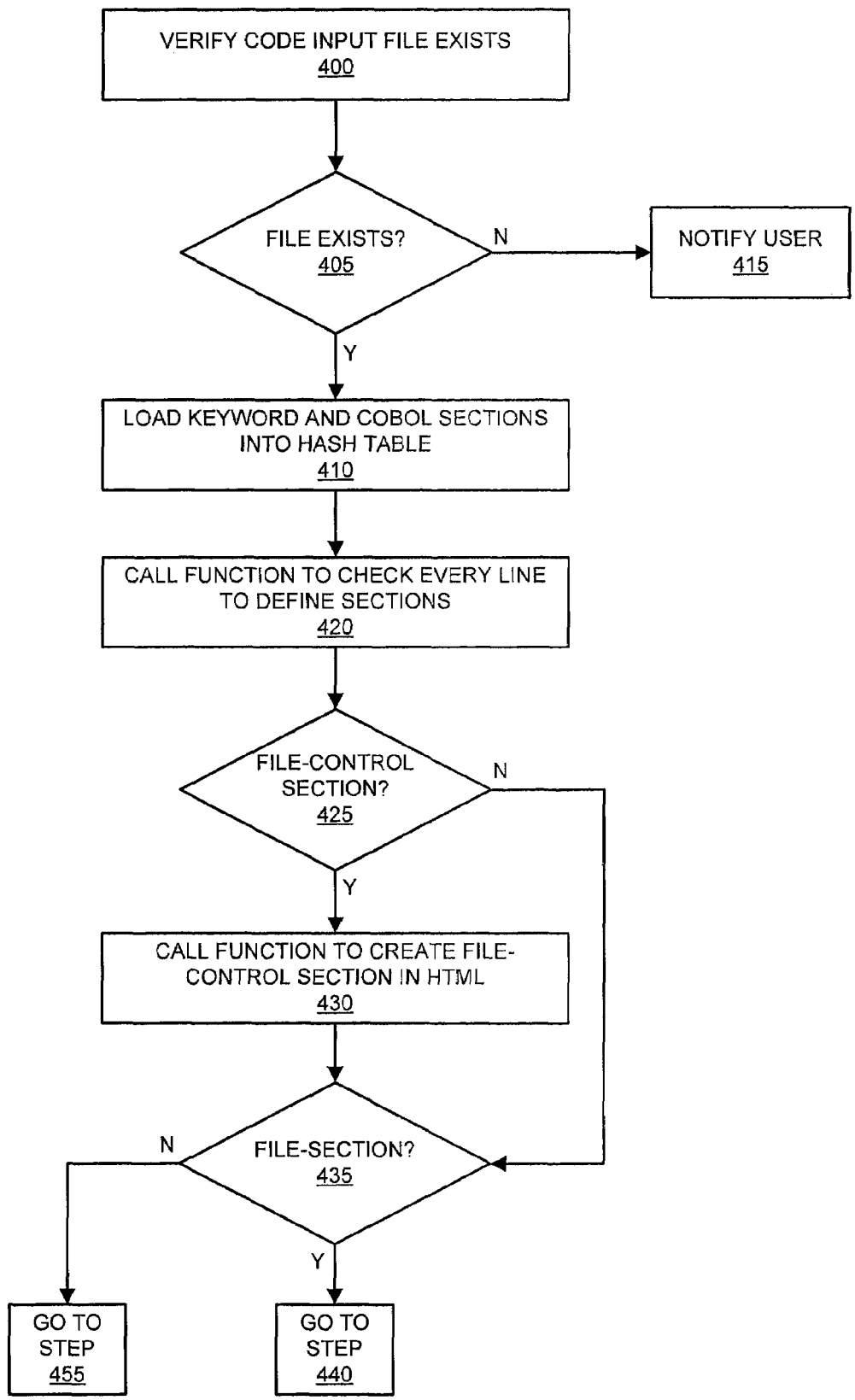
FIG. 4A is a flow chart illustrating an exemplary method for transforming code from a mainframe to hyperlink-enabled code within html documents according to an embodiment of the present invention; and, FIG. 4B is a flow chart which is a continuation of FIG. 4 illustrating an exemplary method for transforming code from a mainframe to hyperlink-enabled code within html documents according to an embodiment of the present invention.
Figure 4B:
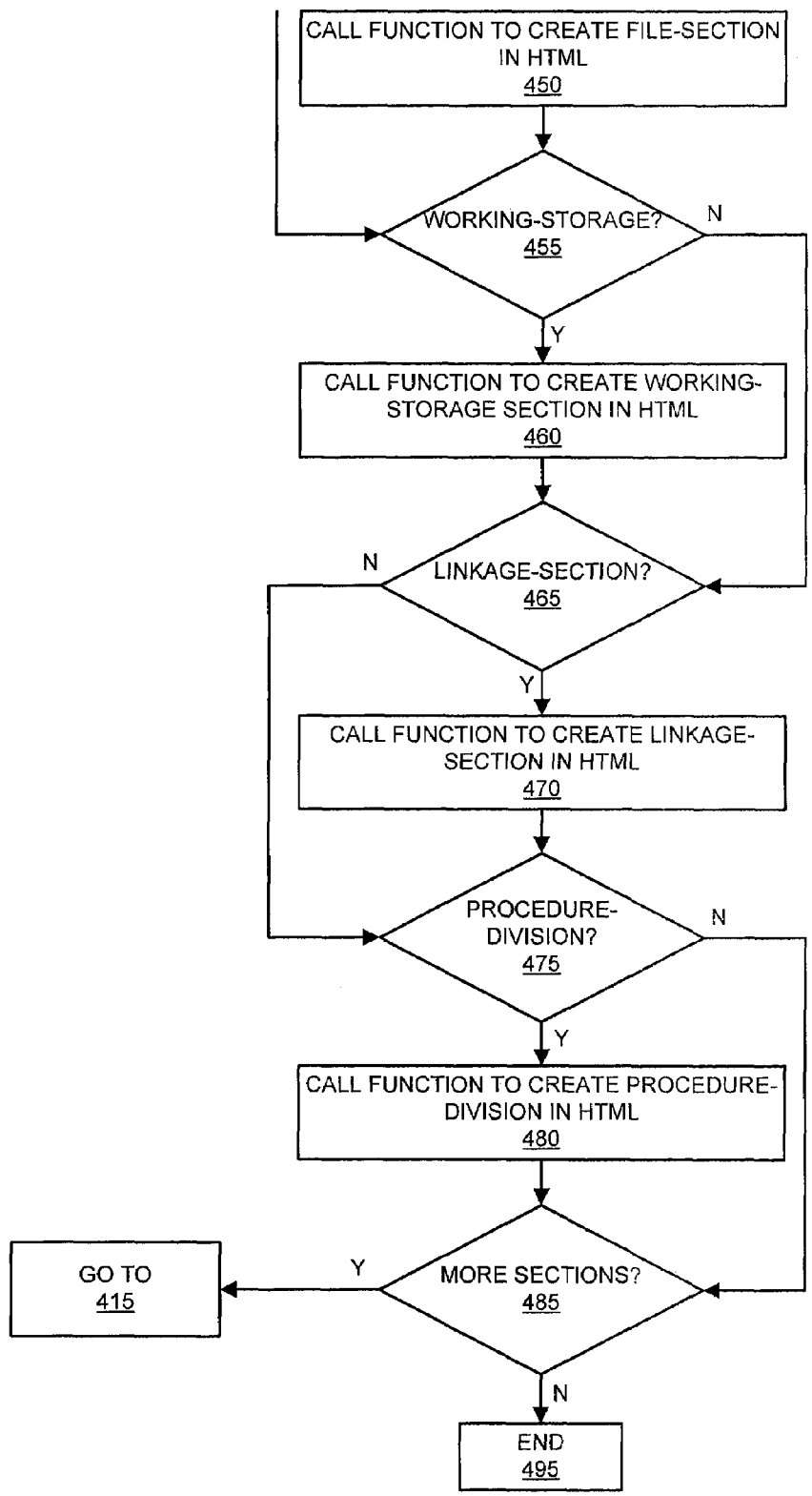

FIG. 4 is a flow chart illustrating an exemplary method for transforming code from a mainframe to hyperlink-enabled code within HTML documents according to an embodiment of the present invention. Specifically, FIGS. 4A and 4B provide a more detailed view of processing steps employed by the invention in order to produce hypertext enabled documents from one or more source code files.

After one or more source code files have been selected for processing, parser utility 130 may verify that the code input file(s) exists and that it is in a proper format (step 400). If the any portion of the file(s) do not exist, or if it is not of a proper format (step 405), then CAT 110 may notify the requesting participant (step 415) via error message or webpage who may select another file or exit the system. If the file does exist and is in a proper format (step 405), then parser utility may load the source code into a hash table or other temporary storage device (step 410). Similarly, parser utility 130 loads into a hash table a list of keywords from a file containing a number of keywords relevant to the specific programming language. Keywords enable the parser utility 130 to recognize words within a program, determine how to parse code and hyperlink enable individual code elements. For example, the keyword "move" may be defined within a keyword list. Therefore, when the parser utility 130 encounters the "move" keyword within code, it converts the word into a hyperlink that links to a definition, "Move copies a value from one variable to another." Further, parser utility 130 calls a parse function to sequentially check every line of code to determine how to define code sections. For example, a source code file may contain any number of programs, subprograms and functions comprising code components. Parser tool 130 must be able to determine where individual code components start and end in order to divide them into individual HTML files. The parse function may search for keywords in order to identify divisions and sections.

When parsing utility 130 encounters a section, it may determine what section it is and then call a function to create that section in HTML. In one embodiment, these functions may reside with HTML generator. If parser utility 130 encounters the File-Control section (step 425), it may call a function to create the File-Control section in HTML (step 430). In COBOL, the File-Control section declares the program's data files. If the section is not the File-Control section, the parsing utility 130 may next determine whether it is the File-Section. The File-Section identifies a Job Control Language (JCL) file definition which provides the complete file layout by the FD/SD. If the section is the File-Section (step 435) then parser utility 130 may call a function to create the File-Section in HTML (step 450). If the section is not the File-Section (435), then parser utility 130 may determine whether the section is Working-Storage (step 455) and if so call a function to create the Working-Storage section in HTML (step 460). Otherwise, if it is not the Working-Storage section (step 455), then parser utility 130 may verify whether the section is the Linkage-Section (step 465) and if so, call a function to create the Linkage-Section in HTML (step 470). If the current section is not the Linkage section (step 465), the parser utility may next determine whether or not it is the COBOL Procedure-Division (step 475). Procedure-Division contains the complete source code which is divided into individual paragraphs and contains the code used to manipulate the data described in the Data-Division. If the section is the Procedure-Division section (step 475), then parser utility may call a function to create the Procedure-Division in HTML (step 480).

When parsing utility 130 encounters a section, it may determine what section it is and then call a function to create that section in HTML. In one embodiment, these functions may reside with HTML generator. If parser utility 130 encounters the File-Control section (step 425), it may call a function to create the File-Control section in HTML (step 430). In COBOL, the File-Control section declares the program's data files. If the section is not the File-Control section, the parsing utility 130 may next determine whether it is the File-Section. The File-Section identifies a Job Control Language (JCL) file definition which provides the complete file layout by the FD/SD. If the section is the File-Section (step 435) then parser utility 130 may call a function to create the File-Section in HTML (step 450). If the section is not the File-Section (435), then parser utility 130 may determine whether the section is Working-Storage (step 455) and if so call a function to create the Working-Storage section in HTML (step 460). Otherwise, if it is not the Working-Storage section (step 455), then parser utility 130 may verify whether the section is the Linkage-Section (step 465) and if so, call a function to create the Linkage-Section in HTML (step 470). If the current section is not the Linkage section (step 465), the parser utility may next determine whether or not it is the COBOL Procedure-Division (step 475). Procedure-Division contains the complete source code which is divided into individual paragraphs and contains the code used to manipulate the data described in the Data-Division. If the section is the COBOL Procedure-Division section (step 475), then parser utility may call a function to create the Procedure-Division in HTML (step 480).

While the steps and related code example which has been incorporated by reference represent an exemplary embodiment of the invention, practitioners will appreciate that there are any number of computing algorithms that may be applied to create similar results. The steps and related code example are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

We claim:

1. A computer-implemented method for facilitating the creation of a first hypertext markup language (HTML) file from a source code file, said method including:

receiving a selection, on a first computer, of said source code file, wherein said source code file comprises COBOL source code and is stored on a second computer;

requesting said source code file from said second computer;

receiving said source code file from said second computer;

verifying a source code section of said source code file by searching for a linkage-section, a working-storage section, a file-control section, a data-division section, a job control language (JCL) section, a procedure division, a COBOL command, a comment line, a procedure, and a function;

parsing said source code file to extract said source code section from said source code file transforming said source code section into said first HTML file;

generating an HTML bundle comprising said first HTML files and other HTML files created for and related to said source code file; and creating hyperlinks, in at least one of said first HTML file or said HTML bundle between interdependent source code sections.

2. The method of claim 1, further including transmitting said first HTML file to a third computer.

3. The method of claim 1, wherein said receiving a selection includes receiving, at said first computer, a selection of said source code file associated with a mainframe computer.

4. The method of claim 3, wherein said source code file includes transferring said source code file from said mainframe computer to a memory of said first computer.

5. The method of claim 1, wherein said transforming step includes converting said source code section into said first HTML file which contains an hyperlink to a second HTML file.

6. The method of claim 1, wherein said transforming step includes converting said source code section into said first HTML file which is stored in a database.

7. The method of claim 1, further including creating an index in a second HTML file, wherein said index includes entries corresponding to said first HTML file.

8. The method of claim 1, further including inserting a code comment within said first HTML file.

9. A tangible computer-readable storage medium containing a set of instructions comprising:
   instructions to receive a selection, on a first computer, of a source code file, wherein said source code file comprises COBOL source code and is stored on a second computer;
   instructions to request said source code file from said second computer;
   instructions to receive said source code file from said second computer;
   instructions to verifying a source code section of said source code file by searching for a linkage-section, a working-storage section, a file-control section, a data-division section, a job control language (JCL) section, a procedure division, a COBOL command, a comment line, a procedure, and a function;
   instructions to parse said source code file to extract said source code section from said source code file;
   instructions to transform said source code section into a first HTML file; and
   instructions to generate an HTML bundle comprising said first HTML and other HTML files created for and related to said source code file;
   instructions to create hyperlinks, in at least one of said first HTML file or said HTML bundle, between interdependent source code sections.

10. A first computer system configured to:
    receive a selection of said source code file, wherein said source code file comprises COBOL source code and is stored on a second computer system;
    request requesting said source code file from said second computer system;
    receive said source code file from said second computer system;
    store said source code file on a memory of said first computer system;
    verify a source code section of said source code file by searching for a linkage-section, a working-storage section, a file-control section, a data-division section, a job control language (JCL) section, a procedure division, a COBOL command, a comment line, a procedure, and a function;
    parse said source code file to extract said source code section from said source code file;
    transform said source code section into a first HTML file;
    generate an HTML bundle comprising said first HTML file and other HTML files created for and related to said source code file; and
    create hyperlinks, in at least one of said first HTML file or said HTML bundle, between interdependent source code sections.

11. The system of claim 10, further configured to transmit said first HTML file to a third computer.

12. The system of claim 10, wherein said receive a selection is further configured to receive a selection of said source code file associated with a mainframe computer.

13. The system of claim 12, wherein said receive said source code file is further configured to transfer said source code file from said mainframe computer to a memory of said first computer.

14. The system of claim 10, wherein said transform is further configured to convert said source code section into said first HTML file which contains a hyperlink to a second HTML file.

15. The system of claim 10, wherein said transform is configured to convert said source code section into said first HTML file which is stored in a database.

16. The system of claim 10, further configured to create an index in a second HTML file, wherein said index includes entries corresponding to said first HTML file.

* * * * *

UNITED STATES PATENT AND TRADEMARK OFFICE
CERTIFICATE OF CORRECTION

PATENT NO. : 7,594,222 B2  Page 1 of 1
APPLICATION NO. : 11/143016
DATED : September 22, 2009
INVENTOR(S) : Horwitz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1148 days.

Signed and Sealed this

Twenty-eighth Day of September, 2010

David J. Kappos
*Director of the United States Patent and Trademark Office*